(12) United States Patent
Curtiss et al.

(10) Patent No.: US 6,757,116 B1
(45) Date of Patent: Jun. 29, 2004

(54) DISK BIASING FOR MANUFACTURE OF SERVO PATTERNED MEDIA

(75) Inventors: Donald Everett Curtiss, Los Gatos, CA (US); Koichi Wago, Sunnyvale, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 146 days.

(21) Appl. No.: 10/056,070

(22) Filed: Jan. 28, 2002

Related U.S. Application Data (60) Provisional application No. 60/312,927, filed on Aug. 16, 2001.

(51) Int. Cl.[7] .............................. G11B 5/86; A01J 21/00; B29D 11/00
(52) U.S. Cl. ................... 360/15; 360/99.08; 360/98.08; 65/305; 425/406; 425/810; 264/1.7; 264/207
(58) Field of Search ....................... 360/135, 17, 99.08, 360/98.07, 98.08, 99.12, 15, 77.03, 77.05, 77.07, 77.08; 65/305, 319, 356; 425/406, 810, 385; 264/1.7, 107, 427, 293, 320

(56) References Cited

U.S. PATENT DOCUMENTS

| | | | |
|---|---|---|---|
| 5,067,039 A | * 11/1991 | Godwin et al. ............. | 360/135 |
| 5,585,989 A | * 12/1996 | Kuromiya et al. .......... | 360/135 |
| 5,982,736 A | 11/1999 | Pierson | |
| 5,982,740 A | 11/1999 | Schwartz | |
| 5,992,783 A | 11/1999 | Trabert | |
| 6,002,663 A | 12/1999 | Sandstrom | |
| 6,030,556 A | 2/2000 | DePuydt et al. | |
| 6,039,898 A | 3/2000 | Glushko | |
| 6,045,980 A | 4/2000 | Edelkind et al. | |
| 6,078,557 A | 6/2000 | Pierson | |
| 6,081,990 A | * 7/2000 | Kuroba et al. ............ | 29/603.01 |
| 6,088,200 A | * 7/2000 | Morita ........................ | 360/135 |
| 6,127,017 A | 10/2000 | Hirata et al. | |
| 6,139,936 A | * 10/2000 | Weiss .......................... | 428/141 |
| 6,190,838 B1 | 2/2001 | Kerfeld | |
| 6,238,846 B1 | 5/2001 | Tacken | |
| 6,333,089 B1 | * 12/2001 | Hirata et al. ................ | 428/64.1 |
| 6,432,346 B1 | * 8/2002 | Hall ............................ | 264/427 |

FOREIGN PATENT DOCUMENTS

| | | | | |
|---|---|---|---|---|
| JP | 03073406 A | * | 3/1991 | ........... G11B/5/596 |
| JP | 06068444 A | * | 3/1994 | ........... G11B/5/596 |
| JP | 2000306309 A | * | 11/2000 | ........... G11B/17/04 |

* cited by examiner

Primary Examiner—William Klimowicz
(74) Attorney, Agent, or Firm—McDermott, Will & Emery (57) ABSTRACT

A method of manufacturing a patterned data/information storage and retrieval medium in the form of an annular disk having an outer diameter, a central opening defining an inner diameter, and opposed first and second major surfaces, the method including inserting a smaller diameter cylindrical shaft of a stamping/imprinting tool in the central opening and biasing the inner diameter of the disk into contact with the cylindrical shaft at a pre-selected location along the inner diameter of the disk during stamping/imprinting of a pre-selected pattern such as a servo pattern in at least one of the first and second major surfaces of the disk, the biasing creating a space between the inner diameter of the disk and the surface of the cylindrical shaft which has a maximum width at a location diametrically opposite the pre-selected location. A disk drive system is then formed by mounting the patterned medium on a drive spindle shaft with the medium biased into contact with the shaft at the pre-selected location along the inner diameter of the medium, whereby proper centering of the servo pattern is provided.

10 Claims, 3 Drawing Sheets

DISK BIASING FOR MANUFACTURE OF SERVO PATTERNED MEDIA

CROSS-REFERENCE TO PROVISIONAL APPLICATION

This application claims priority from U.S. provisional patent application Serial No. 60/312,927 filed Aug. 16, 2001, the entire disclosure of which is incorporated herein by reference.

FIELD OF THE INVENTION

The present invention relates to methods and apparatus for forming servo patterns in annular disk-shaped substrates for recording media utilized in high areal, high track density applications. The invention has particular utility in the manufacture of magnetic data/information storage and retrieval media, e.g., hard disks utilized in computer and computer-related applications.

BACKGROUND OF THE INVENTION

Figure 1:
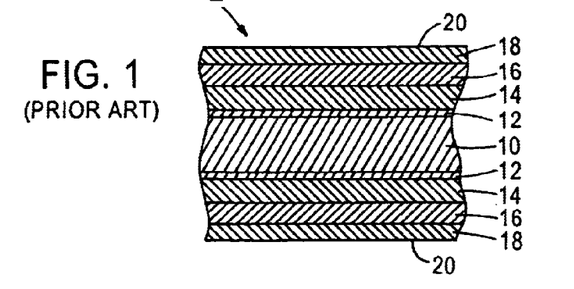
FIG. 1 is a simplified, schematic cross-sectional view, of a portion of a dual-sided, thin-film magnetic disk medium of the type contemplated for use in the present invention.

Magnetic recording media are widely used in various applications, particularly in the computer industry. Referring now to FIG. 1, shown therein, in simplified, schematic cross-sectional view, is a portion of a dual-sided, thin-film magnetic disk medium 1 of the type contemplated by the present invention, comprising a rigid, non-magnetic substrate 10, typically comprised of an aluminum (Al) alloy, e.g., Al—Mg. Alternative materials for use as substrate 10 include glass, ceramics, glass-ceramics composites and laminates, polymers, and other non-magnetic metals and alloys. Al-based substrate 10 is provided, in sequence, at both major surfaces, with a polished and/or textured amorphous Ni—P underlayer 12, a polycrystalline seed layer 14, typically a Cr-based layer deposited by sputtering, a magnetic layer 16 comprised of a ferromagnetic material, e.g., an oxide or a Co-based alloy, a protective overcoat layer 18, typically of a diamond-like carbon (DLC) material, and a lubricant topcoat layer 20, e.g., of a fluorine-containing polymer.

In operation of medium 1, the magnetic layer 13 can be locally magnetized by a write transducer or write head, to record and store data/information. The write transducer creates a highly concentrated magnetic field which alternates direction based on the bits of information being stored. When the local magnetic field produced by the write transducer is greater than the coercivity of the recording medium layer 13, then the grains of the polycrystalline medium at that location are magnetized. The grains retain their magnetization after the magnetic field produced by the write transducer is removed. The direction of the magnetization matches the direction of the applied magnetic field. The pattern of magnetization of the recording medium can subsequently produce an electrical response in a read transducer, allowing the stored medium to be read.

Thin film magnetic recording media are conventionally employed in disk form for use with disk drives for storing large amounts of data in magnetizable form. Typically, one or more disks are rotated on a central axis in combination with data transducer heads. In operation, a typical contact start/stop ("CSS") method commences when the head begins to slide against the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions, allowing data to be recorded on and retrieved from the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the static position, and during deceleration just prior to completely stopping. Each time the head and disk assembly is driven, the sliding surface of the head repeats the cyclic sequence consisting of stopping, sliding against the surface of the disk, floating in air, sliding against the surface of the disk, and stopping.

It is considered desirable during reading and recording operations, and for obtainment of high areal recording densities, to maintain the transducer head(s) as close to the associated recording surface(s) as is possible, i.e., to minimize the "flying height" of the head(s). Thus a smooth recording surface is preferred, as well as a smooth opposing surface of the associated transducer head, thereby permitting the head and the disk surface to be positioned in close proximity, with an attendant increase in predictability and consistent behavior of the air bearing supporting the head during motion.

Disk drives typically comprise a magnetic head assembly mounted on the end of a support or actuator arm which positions the head radially over the disk surface. If the actuator arm is held stationary, the magnetic head assembly will pass over a circular path on the disk surface known as a track, and information can be read from or written to that track. Each concentric track has a unique radius, and reading and writing information from or to a specific track requires the magnetic head to be located above the track. By moving the actuator arm, the magnetic head assembly is moved radially over the disk surface between tracks.

The disk drive must be able to differentiate between tracks on the disk and to center the magnetic head over any particular track. Most disk drives use embedded "servo patterns" of magnetically recorded information on the disk. The servo patterns are read by the magnetic head assembly to inform the disk drive of the track location. Tracks typically include both data sectors and servo patterns. Each data sector contains a header followed by a data section. The header may include synchronization information to synchronize various timers in the disk drive to the speed of disk rotation, while the data section is used for recording data. Typical servo patterns are described in, for example, U.S. Pat. Nos. 6,086,961 and 6,139,936, the entire disclosures of which are incorporated herein by reference.

Figure 2:
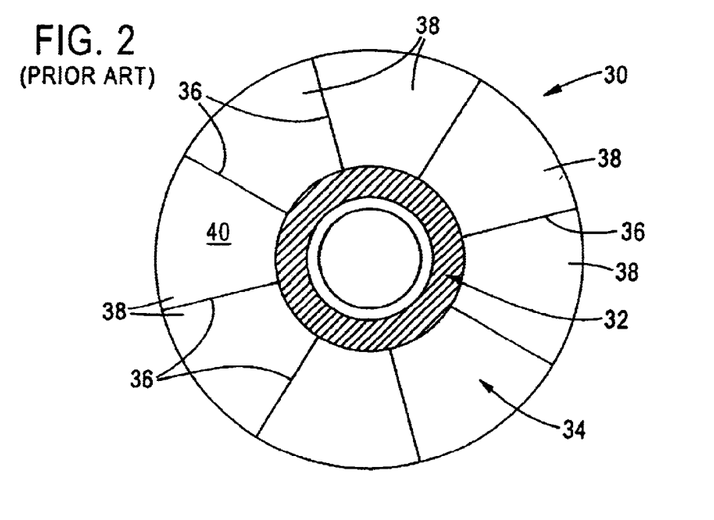
FIG. 2 is a simplified, schematic plan view of a magnetic recording disk according to the present invention, including a data zone having a plurality of discrete servo tracks, and a contact start/stop (CSS) zone.

Adverting to FIG. 2, shown therein, in simplified, schematic plan view, is a magnetic recording disk 30 having a data zone 34 including a plurality of discrete servo tracks, and a contact start/stop (CSS) zone 32. A discrete servo pattern 40 is formed on or within the data zone 34, and includes a number of data track zones 38 separated by servo tracking zones 36. The data storage function of disk 30 is confined to the data track zones 38, while servo tracking zones 36 provide information to the disk drive which allows a read/write head to maintain alignment on the individual, tightly-spaced discrete data tracks.

Although only a relatively few of the servo tracking zones are shown in FIG. 2 for illustrative simplicity, it should be recognized that the discrete track patterns of the media contemplated herein may include several hundreds of servo zones to improve head tracking during each rotation of the disk. In addition, the servo tracking zones need not be straight radial zones as shown in the figure, but may instead comprise arcs, intermittent zones, or irregularly-shaped zones separating individual data tracks.

Figure 3:
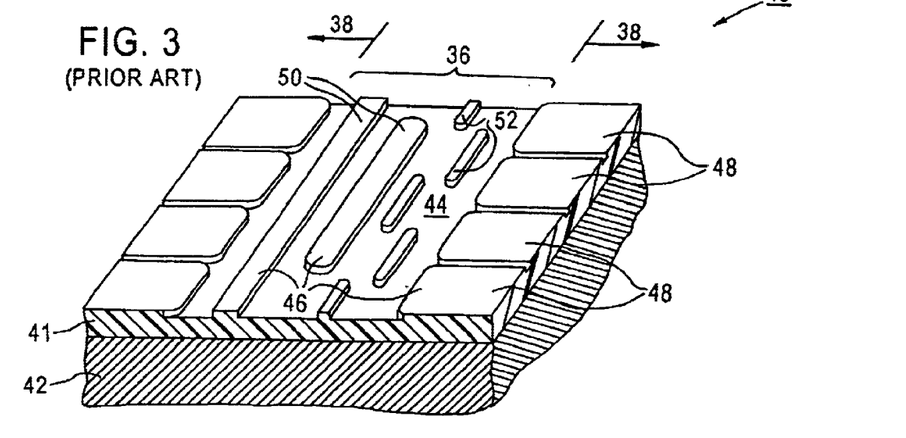
FIG. 3 is a simplified, schematic perspective view of an enlarged portion of a discrete servo track pattern formed on or within a recording medium of thin film layer structure.

Referring now to FIG. 3, shown therein in simplified, schematic perspective view, is an enlarged portion of a discrete servo track pattern 40 formed on or within the recording media thin film layer structure 41 (corresponding to layers 12–20 of FIG. 1), which in turn is disposed on the surface of substrate 42 for a discrete track medium (corresponding to substrate 10 of FIG. 1). The various elements or features of pattern 40 are generally defined by a difference in height between recessed zones or regions 44 and raised zones or regions 46. As illustrated, pattern 40 includes a pair of discrete track zones 38 separated by a servo tracking zone 36.

Servo tracking zone 36 generally includes track identification (ID) bars 50 and tracking position bars 52. ID bars 50 provide the identification for each of the discrete tracks 48 of the discrete track pattern 40. Tracking bars 52 provide the disk drive with feedback of the accuracy with which the read/write head is tracking a particular discrete track 48. Typically, tracking bars 52 extend to approximately the middle of the path defined by each track 48 and are staggered, so that each discrete track 48 includes at least one tracking bar 52 extending from the middle of the track path toward the axis of the disk, and one tracking bar 52 which extends radially outward from the middle of the track path.

Servo patterns are usually written on the disk during manufacture of the disk drive, after the drive is assembled and operational. The servo pattern information, and particularly the track spacing and centering information, needs to be located very precisely on the disk surface. However, at the time the servo patterns are written, there are no reference locations on the disk surface which can be perceived by the disk drive. Accordingly, a highly specialized device known as a "servo-writer" is used during writing of the servo-patterns. Largely because of the locational precision needed, servo-writers are expensive, and servo-writing is a time-consuming process.

One approach (i.e., "PERM" disks, manufactured by Sony Corp.) to avoid traditional servo-writing has been to injection mold or stamp servo patterns on a polymer-based substrate disk. A constant thickness layer of magnetic recording material is then applied over the entire disk surface, including the depressions and protrusions of the servo patterns. After all of the constituent layers of the medium have been applied to the disk, a magnetic bias is recorded on the servo patterns. For example, a first magnetic field may magnetically initialize the entire disk at a one setting. Then a second magnetic field, located at the surface of the disk and e.g., provided by the magnetic head of the disk drive, is used to magnetize the protruding portions of the servo patterns relative to the depressions. Because the protrusions are closer than the depressions to the magnetic initialization, the magnetization carried by the protrusions may be different than the magnetization carried by the depressions. When read, the resulting disk servo patterns show magnetic transitions between the depressions and the protrusions.

A recently developed, low cost technique which can be utilized for forming "patterned media" e.g., media comprising a discrete track pattern (e.g., pattern 40 of FIG. 3) in the surface of a magnetic recording medium, without requiring the use of a servo-writer or equivalent device, is disclosed in U.S. Pat. No. 5,772,905, the entire disclosure of which is incorporated herein by reference. As utilized herein, the term or expression "patterned magnetic media" is taken as including thin film, high areal density, longitudinal or perpendicular magnetic media which are patterned to include at least one of a servo pattern, a data track pattern, and an identification number or symbol, as well as magnetic media comprising a large plurality of discrete magnetic nano-structures, e.g., columns or pillars of magnetic material.

In essence, the thermal imprint lithographic technique disclosed in the above patent, when applied to the manufacture of patterned magnetic media, involves etching or ion milling a magnetic recording layer or laminate of layers on a suitable substrate, utilizing a resist mask formed by thermal imprint lithography rather than optical (photo) lithography. A typical thermal imprint lithographic process for forming nano-dimensioned patterns/features in a surface of a thin film magnetic recording medium or a substrate therefor is illustrated with reference to the simplified, schematic cross-sectional views of FIGS. 4(A)–4(D).

Figure 4A:
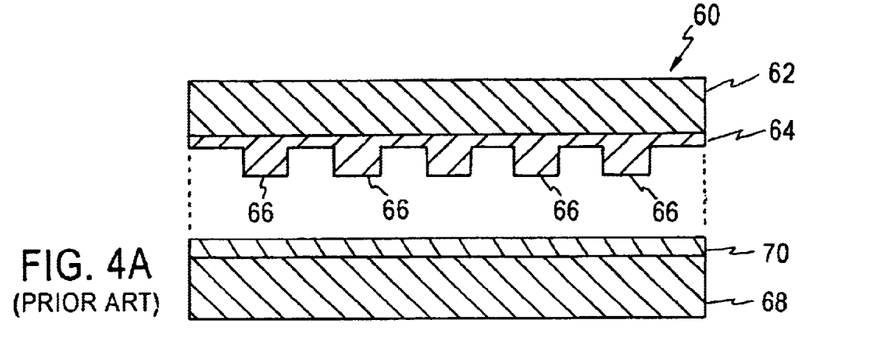
FIGS. 4(A)–4(D) are simplified, schematic cross-sectional views illustrating a process sequence for performing thermal imprint lithography of a thin resist film on a substrate (workpiece) according to the conventional art.

Referring to FIG. 4(A), shown therein is a mold 60 (also known as a stamper or imprinter) including a main body 62 having upper and lower opposed surfaces, with a molding layer 64 (also referred to as an imprinting surface) formed on the lower opposed surface. As illustrated, molding layer 64 includes a plurality of features 66 having a desired shape or surface contour. A thin film magnetic recording medium 68 comprised of a stack of thin film layers on a substrate, or only the substrate therefor (also identified by reference numeral 68), either one carrying a thin film layer 70 on an upper surface thereof, is positioned below, and in facing relation to the molding layer 64. Thin film layer 70, comprised of a resist or thermoplastic polymer material, e.g., a polymethyl methacrylate (PMMA), may be formed on the substrate/workpiece surface by any appropriate technique, e.g., spin coating.

Figure 4B:
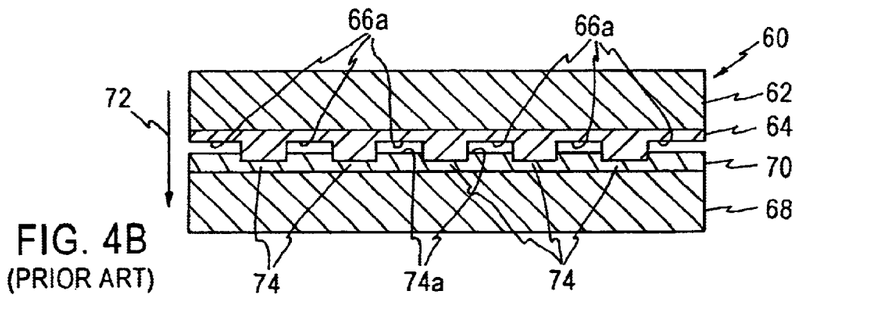

Adverting to FIG. 4(B), shown therein is a compressive molding step, wherein mold 60 is pressed into the thin film layer 70 in the direction shown by arrow 72, so as to form depressed, i.e., compressed, regions 74. In the illustrated embodiment, features 66 of the molding layer 64 are not pressed all of the way into the thin film layer 70 and thus do not contact the surface of the underlying magnetic medium or substrate 68. However, the top surface portions 74a of thin film 70 may contact depressed surface portions 66a of molding layer 64. As a consequence, the top surface portions 74a substantially conform to the shape of the depressed surface portions 66a, for example, flat. When contact between the depressed surface portions 66a of molding layer 64 and thin film layer 70 occurs, further movement of the molding layer 64 into the thin film layer 70 stops, due to the sudden increase in contact area, leading to a decrease in compressive pressure when the compressive force is constant.

Figure 4C:
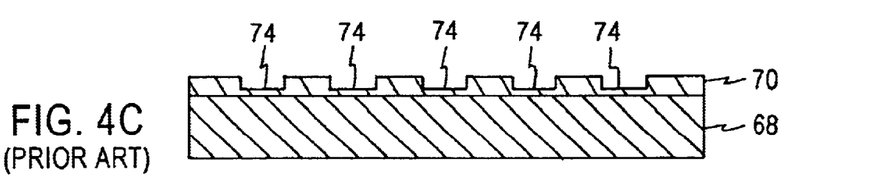
Figure 4D:
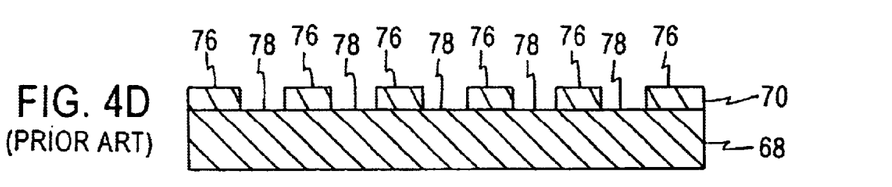

FIG. 4(C) shows the cross-sectional surface contour of the thin film layer 70 following removal of stamper or mold 60. The molded, stamped, or imprinted thin film layer 70 includes a plurality of recesses formed at compressed regions 74 which generally conform to the shape or surface contour of features 76 of the molding layer 64. Referring to FIG. 4(D), in a next step, the surface-molded workpiece comprising the magnetic medium or substrate 68 therefor is subjected to further processing to remove the compressed portions 74 of thin film 70 for selectively exposing portions 78 of the underlying magnetic medium or substrate 68 therefor, separated by raised features 76. Selective removal of the compressed portions 74 may be accomplished by any appropriate process, e.g., reactive ion etching (RIE) or wet chemical etching. The thus-patterned thin film layer 70 may subsequently be utilized as a mask for selective removal of the exposed substrate portions 78, after which the patterned thin film layer 70 is itself selectively removed, leaving a patterned magnetic medium or substrate 68 therefor.

The above-described imprint lithographic processing is capable of providing sub-micron-dimensioned features, such as the servo and data tracking features illustrated in FIG. 3, by utilizing a stamper or mold 60 provided with patterned features 66 comprising pillars, bars, holes, trenches, etc., by means of e-beam lithography, RIE, or other appropriate patterning method. Typical depths of features 66 range from about 5 to about 200 nm, depending upon the desired lateral dimension. The material of the molding layer 64 is typically selected to be hard relative to the thin film layer 70, the latter typically comprising a thermoplastic resist material which is softened when heated. Thus, suitable materials for use as the molding layer 64 include metals such as Ni, dielectrics, semiconductors, ceramics, and composite materials. Suitable resist materials for use as thin film layer 70 include thermoplastic polymers which can be heated to above their glass temperature, $T_g$, such that the material exhibits low viscosity and enhanced flow. Yet another recently developed approach for forming servo patterns in hard-surfaced, high modulus alternative substrate materials, such as the glass, ceramic, and glass-ceramic materials described above, without requiring the use of traditional servo-writing means, is based upon the discovery that the surfaces of such materials may be modified, i.e., reduced in hardness, so as to facilitate formation of servo patterns therein, as by a simple and conveniently performed embossing process. According to this methodology, modification (i.e., reduction) of surface hardness of high modulus substrates for use in the manufacture of thin film magnetic recording media is obtained by first forming a relatively soft coating layer on the substrate surface, embossing the desired servo pattern in the exposed upper surface of the relatively soft coating layer, and then converting the relatively soft layer to a relatively hard layer while retaining the embossed servo pattern therein. The thus-formed substrate with embossed servo pattern in the exposed surface thereof is then subjected to thin film deposition thereon for forming the layer stack constituting the magnetic recording medium. Thus, the method advantageously provides servo-patterned magnetic recording media without requiring servo-writing subsequent to media fabrication.

More specifically, according to the above methodology, a relatively soft layer of a sol-gel is initially formed on the surface of the high modulus glass, ceramic, or glass-ceramic composite substrate, e.g., in disk form. By way of illustration, but not limitation, a sol-gel layer having a thickness of from about 0.2 to about 1 μm may be formed on the substrate surface by any convenient technique, e.g., spin coating of a solution of the sol-gel. A suitable sol-gel solution for use according to the invention may be prepared by mixing an alkoxide, e.g., a silicon alkoxide such as tetraethoxysilane ("TEOS") or tetramethoxysilane ("TMOS"), water, and nitric acid at molar ratios of TEOS or TMOS/$H_2O$/$HNO_3$ of 1/4–30/>0.05. The nitric acid acts as a catalyst for conversion of the TEOS or TMOS to a $SiO_2$ sol according to the following reaction (1), illustratively shown for TEOS:

(1)

with ethanol ($C_2H_5OH$) being produced as a reaction product in solution. After completion of reaction, butanol ($C_4H_9OH$) is added to the solution as a drying retardation agent at molar ratios of TEOS/$H_2O$/$HNO_3$/$C_4H_9OH$ of e.g., 1/5/0.05/>4. Such solution, when applied to the substrate surface, e.g., by spin coating, forms a very smooth film with a minimum amount of surface microwaves. The spin coating process effects removal, e.g., by centrifugation and evaporation, of a portion of the solvents from the initially applied solution. The resultant partially dried film or layer is glass-like, principally comprised of silica ($SiO_2$) molecular clusters together with the various solvents ($H_2O$, $C_2H_5OH$, $C_4H_9OH$), and adheres well to the substrate surface. The sol-gel film or layer is of a porous structure with the solvents saturated in the micropores thereof.

The as-deposited, relatively soft sol-gel film or layer applied to the hard-surfaced substrate is then subjected to an embossing process (similar in essential respects to the stamping/imprinting process shown in FIG. 4) for forming a servo pattern in the surface thereof, comprising a patterned plurality of depressions and protrusions, e.g., by utilizing a stamper/imprinter (or mold) having an imprinting surface including a negative image of the desired servo pattern.

Subsequent to servo pattern formation (and mechanical texturing, if desired) of the as-deposited, partially dried, relatively soft sol-gel film or layer, a sintering process is performed at an elevated temperature of from about 300 to above about 1000° C. (depending upon the withstand temperature of the substrate material, which temperature is higher for ceramic-based substrates than for glass-based substrates), to evaporate the solvents so as to effect at least partial collapse of the micro-pores, with resultant densification of the sol-gel film or layer into a substantially fully densified glass layer having a density and hardness approaching that of typical silica glass (<1.5 g/cm$^3$), or into a partially densified "glass-like" layer. The embossed servo pattern (and mechanical texturing) formed in the exposed upper surface of the relatively soft sol-gel layer is preserved in the corresponding exposed upper surface of the sintered glass or glass-like layer.

Formation of thin film magnetic media on the thus-formed glass-coated, servo patterned/mechanically textured substrates is accomplished utilizing conventional thin film deposition techniques, e.g., sputtering, for forming the layer stack comprising a seed layer, polycrystalline underlayer, magnetic layer, and protective overcoat layer. The sol-gel—based process thus combines the advantages of low-cost processing techniques for servo patterning with the superior optical, mechanical, and chemical properties of silica glass ($SiO_2$) for fabricating high performance, servo-patterned magnetic recording media.

Figure 5A:
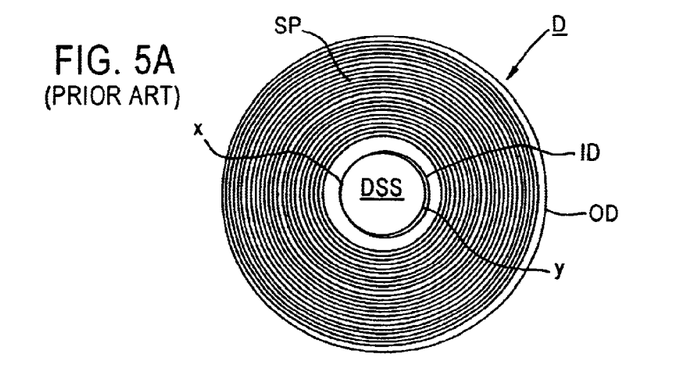
FIGS. 5(A)–5(B) are simplified, schematic plan and cross-sectional views, respectively, of an annular disk with its inner diameter biased against a slightly smaller diameter, rotatable drive spindle shaft of a disk drive for performing precise servo patterning of the disk according to traditional methodology utilizing a servo-writer or equivalently performing device subsequent to installation of the disk in the disk drive.
Figure 5B:
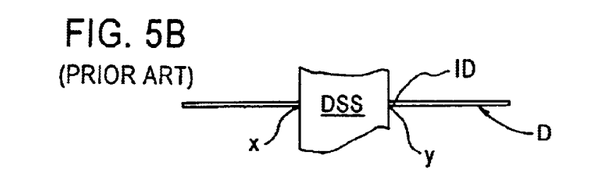

As indicated above, the servo pattern information, particularly the track spacing and centering information, must be very precisely located on the disk surface. According to traditional methodology utilizing a servo-writer or equivalently performing device subsequent to installation of the disk(s) in the disk drive utilizes a disk biasing procedure for this purpose. FIGS. 5(A)–5(B), which are illustrative of such disk biasing technique, are schematic plan and cross-sectional views, respectively, of an annular disk D of inner diameter ID and outer diameter OD assembled onto the slightly smaller diameter, rotatable drive spindle shaft DSS of a disk drive for performing precise servo patterning of the disk. According to traditional methodology for obtaining precisely formed and centered servo patterns when utilizing a servo-writer or equivalently performing device subsequent to installation of the disk(s) D in the disk drive, the disk(s)

D is (are) assembled onto the rotatable drive spindle shaft DSS of the disk drive with the inner diameter ID of the disk(s) D being pressed (i.e., biased) against the outer surface of the drive spindle shaft DSS at a (randomly located) point of contact x thereof, with a small spacing of maximum width y being formed between the disk inner diameter ID and the surface of the drive spindle shaft DSS at a location diametrically opposite the point of contact x. With the disk(s) D thus installed, the servo pattern SP is written on the surface(s) of the disk(s) by using the head gimbal assembly ("HGA") of the disk drive (not shown in the figure for illustrative simplicity) together with an interferometer or equivalently performing device for feedback of the HGA position to the disk drive electronics/control system. As a consequence of the above physical arrangement of disk(s) D and drive spindle shaft DSS, the servo pattern is written onto the surface(s) of the disk(s) D in as concentric a fashion as permitted by the HGA, HGA positioning system, and inherent system wobble due to spacing y arising from the biased mounting of the disk(s) D.

However, despite installation of the disk in a biased, off-centered fashion, the servo pattern(s) SP formed on the surface(s) of the disk(s) D by the above conventional process is (are) sufficiently concentric with the axis of rotation of the drive spindle shaft DSS for the disk drive electronics/control system to compensate for any deviations from concentricity of the servo pattern(s). On the other hand, when servo-patterned media are produced by any of the above-described alternative processes wherein a stamper/imprinter is utilized for servo patterning of the media (or substrate therefor) prior, rather than subsequent to installation in the disk drive, a problem arises when the thus servo-patterned disk(s) D is (are) installed on the drive spindle shaft DSS. Specifically, the servo-patterned disk(s) D must be installed on the drive spindle shaft DSS such that the servo pattern(s) SP is (are) sufficiently concentric with the axis of rotation of the drive spindle shaft DSS to permit an adequate amount of compensation for deviations from concentricity of the servo pattern(s) by the electronics/control system of the disk drive. However, the apparent or straightforward solution to the problem, involving first precisely centering the servo pattern on the disk surface and then precisely centering the disk on the drive spindle shaft, would be time consuming and very costly to implement when applied to large scale, automated manufacture of patterned media and disk drives including same.

In view of the above, there exists a need for a means and methodology for forming patterned media, i.e., servo patterned disk-shaped media and/or substrates therefor, prior to installation of the media in the disk drive, which means and methodology eliminate any possibility of poor disk/shaft registration leading to excessive deviations from concentricity of the servo patterns which cannot be adequately compensated for by conventional disk drive electronics/control systems. Moreover, there exists a need for a method and means for performing servo patterning of disk-shaped media which permits simple installation of the patterned media in the disk drive, as by conventional biasing against the disk drive spindle shaft.

The present invention addresses and solves the above-described problems attendant upon the formation and installation of pre-servo-patterned media in conventional disk-drive systems, while maintaining full compatibility with all aspects of automated manufacturing technology for servo-patterned media formation by means of a stamping/imprinting process for embossing the servo patterns in the surface(s) of a disk-shaped recording medium (or substrate therefor).

DISCLOSURE OF THE INVENTION

An advantage of the present invention is an improved method of manufacturing a patterned data/information storage and retrieval medium in the form of an annular disk.

Another advantage of the present invention is an improved method of manufacturing a disk drive system.

Yet another advantage of the present invention is an improved patterned data/information storage and retrieval medium.

Still another advantage of the present invention is an improved disk drive system comprising a patterned data/information storage and retrieval medium.

A further advantage of the present invention is an improved tool for performing stamping/imprinting/embossing of a pre-selected pattern in at least one major surface of an annular disk-shaped substrate.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method of manufacturing a patterned data/information storage and retrieval medium in the form of an annular disk having an outer diameter, a central opening defining an inner diameter, and opposed first and second major surfaces, the method comprising inserting a smaller diameter cylindrical shaft of a stamping/imprinting tool in the central opening of the disk and biasing the inner diameter of the disk into contact with the cylindrical shaft at a pre-selected location along the inner diameter of the disk during stamping/imprinting of a pre-selected pattern in at least one of the first and second major surfaces of the disk, the biasing creating a space between the inner diameter of the disk and the surface of the cylindrical shaft which has a maximum width at a location diametrically opposite the pre-selected location.

According to various embodiments of the present invention, the disk is a thin film magnetic recording medium or a substrate therefor and the pattern comprises a plurality of concentric tracks including data zones and servo tracking zones; and the method comprises stamping/imprinting the pre-selected pattern in both the first and second major surfaces of the disk.

In accordance with certain embodiments of the present invention, the stamping/imprinting of the pattern comprises performing thermal imprint lithography of a layer of a thermoplastic material on at least one of the first and second major surfaces of the disk, and the method further comprises utilizing the thermally imprinted layer(s) as a patterned mask during processing for selectively removing material of the disk exposed through openings formed in the thermally imprinted layer(s); whereas, according to certain other embodiments of the present invention, the stamping/imprinting of the pattern comprises embossing of a layer of a partially dried, soft silica sol-gel material on at least one of the first and second major surfaces of the disk, and further comprises sintering the partially dried, soft silica sol-gel layer subsequent to embossing for forming a fully densified glass layer having a density and hardness approaching that of silica glass.

According to a specific embodiment of the present invention, the method comprises the steps of:

(a) providing a disk including an indicator mark at a location along the inner diameter or the outer diameter of the disk and radially aligned with the pre-selected location along the inner diameter of the disk;

(b) providing a stamping/imprinting tool comprising:
  (i) an elongated cylindrical shaft having a slightly smaller diameter than the inner diameter of the disk, the cylindrical shaft including a location along the length thereof for positioning the disk thereat via the inner diameter thereof; and
  (ii) at least one annular disk-shaped stamper/imprinter means axially movably mounted on the elongated shaft, the at least one stamper/imprinter means having an imprinting surface including a negative image of the pattern, the at least one stamper/imprinter means being adapted to urge the imprinting surface against a respective facing first or second major surface of the disk;

(c) inserting the shaft in the central opening of the disk and positioning the disk at the stated location along the length of the shaft such that at least one of the first and second surfaces thereof faces the imprinting surface of the at least one stamper/imprinter means;

(d) utilizing the indicator mark as an alignment means in biasing the inner diameter of the disk into contact with the surface of the cylindrical shaft at the pre-selected location along the inner diameter of the disk, whereby a space is created between the inner diameter of the disk and the surface of the cylindrical shaft which has a maximum width at a location diametrically opposite the pre-selected location; and (e) urging the imprinting surface of the at least one stamper/imprinter against the at least one facing surface of the disk to imprint the pattern therein.

In accordance with embodiments of the present invention, step (b)(ii) comprises providing a pair of axially movable, annular disk-shaped stamper/imprinter means for imprinting both major surfaces of the disk with the pattern; and step (b)(i) comprises providing the elongated cylindrical shaft with a pair of resilient means for mounting and centering the pair of stamper/imprinter means on the cylindrical shaft.

Another aspect of the present invention is a method of manufacturing a disk drive system, comprising steps of:

(a) forming a patterned, annular disk-shaped data/information storage and retrieval medium having an outer diameter, a central opening defining an inner diameter, and opposed first and second major surfaces, comprising inserting a smaller diameter cylindrical shaft of a stamping/imprinting tool in the central opening of the disk and biasing the inner diameter of the disk into contact with the cylindrical shaft at a pre-selected location along the inner diameter of the disk during stamping/imprinting of a pre-selected pattern in at least one of the first and second major surfaces of the disk; and (b) mounting the patterned disk on a smaller diameter cylindrical drive spindle shaft of a disk drive by inserting the drive spindle shaft in the central opening of the disk, such that the inner diameter of the disk is biased into contact with the cylindrical drive spindle shaft of the disk drive at the pre-selected location, and a space is created between the inner diameter of the disk and the surface of the cylindrical drive spindle shaft which has a maximum width at a location diametrically opposite the pre-selected location.

Yet another aspect of the present invention is a patterned data/information storage and retrieval medium comprising:

an annular disk having an outer diameter, a central opening defining an inner diameter, and opposed first and second major surfaces, at least one of the first and second major surfaces including a pattern formed therein by a method comprising an imprinting or embossing step, the disk further including an indicator mark at a pre-selected location along the inner diameter or the outer diameter of the disk for use in precisely biasing the inner diameter into contact with a cylindrical shaft of smaller diameter at the pre-selected location when the shaft is inserted in the central opening of the disk.

According to embodiments of the present invention, the medium is a thin film magnetic recording medium and the pattern comprises a plurality of concentric tracks including data zones and servo tracking zones; and the pattern is formed in both the first and second major surfaces of the disk by a method comprising an imprinting or embossing step.

In accordance with particular embodiments of the present invention, at least one of the first and second major surfaces of the disk including the pattern formed therein comprises a glass layer.

Still another aspect of the present invention is a disk drive system, comprising:

(a) an annular disk having an outer diameter, a central opening defining an inner diameter, and opposed first and second major surfaces, at least one of the first and second major surfaces including a pattern formed therein by a method comprising an imprinting or embossing step, the disk further including an indicator mark at a pre-selected location along the inner diameter or the outer diameter of the disk for use in precisely biasing the inner diameter into contact with a cylindrical drive spindle shaft of smaller diameter at the pre-selected location when the cylindrical shaft is inserted in the central opening of the disk; and (b) a smaller diameter cylindrical drive spindle shaft extending through the central opening of the annular disk, the inner diameter of the disk being biased into contact with the cylindrical shaft at the pre-selected location, whereby a space is created between the inner diameter of the disk and the cylindrical shaft which has a maximum width at a location diametrically opposite the pre-selected location.

A still further aspect of the present invention is a tool for performing stamping/imprinting/embossing of a pre-selected pattern in at least one major surface of an annular disk-shaped substrate including an outer diameter and a central opening defining an inner diameter, comprising:

(a) an elongated cylindrical shaft, the cylindrical shaft including a location along the length thereof for positioning thereat an annular disk-shaped substrate having a central opening defining an inner diameter which is slightly larger than that of the cylindrical shaft;

(b) at least one annular disk-shaped stamper/imprinter means axially movably mounted on the elongated shaft, the at least one stamper/imprinter means having an imprinting surface including a negative image of said pre-selected pattern, the at least one stamper/imprinter means being adapted to urge the imprinting surface against a respective facing major surface of the disk; and (c) mounting means for mounting an annular disk-shaped substrate in the tool such that the elongated shaft extends through the central opening of the substrate, the imprinting surface of the at least one stamper/ imprinter faces a major surface of the disk, and a pre-selected location along the inner diameter of the disk is biased into contact with the cylindrical shaft, whereby a space is created between the inner diameter of the disk and the cylindrical shaft which has a maximum width at a location diametrically opposite the pre-selected location.

According to embodiments of the present invention, the stamping/imprinting/embossing tool further comprises a pair of axially movable, annular disk-shaped stamper/imprinter means (b) for imprinting both major surfaces of the disk-shaped substrate with the pre-selected pattern, and further comprises a resilient mounting/centering means on the elongated cylindrical shaft (a) for mounting and centering each of the pair of stamper/imprinter means (b) on the elongated cylindrical shaft (a), wherein each of the resilient mounting/centering means comprises a resiliently compressible collet or polymeric ring mounted on the elongated cylindrical shaft.

A yet further aspect of the present invention is a patterned data/information storage and retrieval medium, comprising:

(a) an annular disk-shaped substrate having inner and outer diameters and including a pattern formed in at least one of the major surfaces thereof; and (b) means for centering the pattern when the disk-shaped substrate is mounted on a cylindrical shaft extending through the inner diameter.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent aspects and features, wherein.

DESCRIPTION OF THE INVENTION

The present invention addresses and solves problems attendant upon the use of imprinting or embossing techniques, e.g., nano-imprint lithography or embossing of a sol-gel layer, for forming sub-micron-dimensioned patterns in a substrate/workpiece surface, as in servo patterning of disk-shaped substrates utilized in the manufacture of hard disk recording media according to alternative techniques which obviate the need for performing expensive, time-consuming, post-fabrication servo patterning utilizing servo-writers or like devices. Specifically, the present invention affords a substantial improvement in centering of the servo pattern of patterned disks produced by either of the aforementioned alternative servo patterning techniques in disk drive assemblies, whereby proper alignment/registration of the servo tracks is consistently and conveniently obtained.

A key feature of the present invention is based upon the discovery that proper centering of the servo pattern in the assembled disk drive, whereby the disk drive electronics/control system is able to compensate for any deviations from concentricity of the servo patterns, can be readily and reliably achieved by biasing the same point or location along the inner diameter of the annular disk substrate against a central spindle or shaft of the apparatus utilized for the imprinting or embossing process for forming the servo pattern and against the rotatable drive spindle of the disk drive assembly in which the servo patterned disk is installed. An advantage afforded by the inventive methodology is full compatibility with all other aspects of automated manufacturing technology for pattern formation by imprint lithography and/or sol-gel embossing for servo patterned disk media formation.

Figure 6:
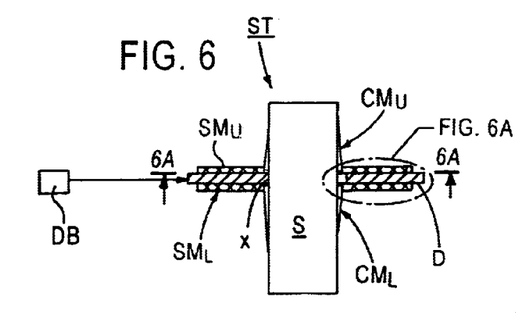
FIGS. 6–6(A) are simplified, schematic cross-sectional views of a portion of a stamping/imprinting tool for performing servo patterning of a biased annular disk medium (or substrate therefore) according to the method of the present invention.
Figure 6A:
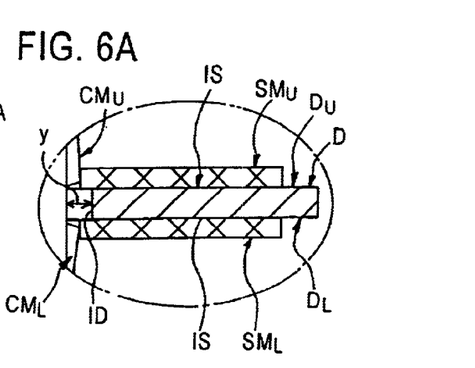
Figure 7:
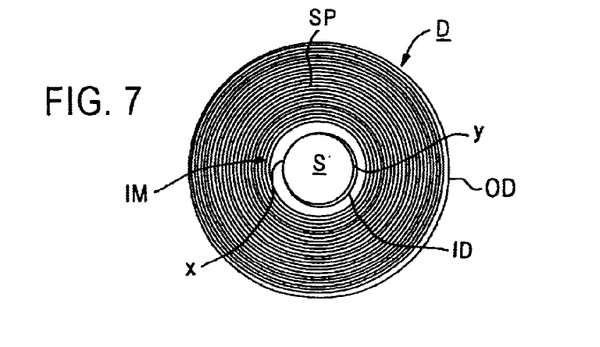
FIG. 7 is a plan view taken along line 6–6' of FIG. 6 for illustrating the biasing of a pre-selected location along the inner diameter of the annular disk against a slightly smaller diameter shaft of the stamping/imprinting tool.

Referring now to FIG. 6, shown therein is a simplified, schematic cross-sectional view of a portion of a stamping/imprinting tool ST for performing servo patterning of a biased annular disk medium D (or substrate therefor) according to the method of the present invention, comprising an elongated, cylindrical shaft S of diameter slightly smaller than the inner diameter ID of annular disk medium D for allowing passage of the former through the central opening (i.e., inner diameter ID) of the latter for positioning disk D at a pre-selected location along the length of shaft S so as to be sandwiched between upper and lower annular disk-shaped, axially movable stamper/imprinter means $SM_U$ and $SM_L$, respectively. Each of the upper and lower annular disk-shaped stamper/imprinter means $SM_U$ and $SM_L$ includes an imprinting surface IS (e.g., of Ni) including a negative image of a pre-selected pattern to be formed in the respective confronting upper and lower surfaces $D_U$ and $D_L$ of disk D, e.g., a concentrically arranged servo pattern SP such as illustrated in FIG. 5(A). Each of the upper and lower annular disk-shaped stamper/imprinter means $SM_U$ and $SM_L$ further includes a respective centering means $CM_U$, $CM_L$, e.g., in the form of an expanding collet or resilient polymer ring, for accurately and positively centering each of the stamper/imprinter means to shaft S. Stamping/imprinting tool ST further includes a disk bias means DB for biasing (i.e., urging) the inner diameter ID of disk D into contact with shaft S at a location x along the inner diameter ID, so as to create a spacing y between the shaft S and the disk inner diameter ID, the maximum width of spacing y being at a location diametrically opposite to contact point x, similar to the situation shown in FIGS. 5(A)–5(B) illustrating biased mounting of conventionally servo-patterned disk media in disk drive systems. As best seen in the plan view of FIG. 7 taken along line 6–6' of FIG. 6, according to the invention, one of the upper or lower surfaces $D_U$ or $D_L$ of disk D is provided at the inner diameter ID thereof with an indicator mark IM for use as a reference point for accurately determining the point of contact x of the disk inner diameter ID with shaft S of the stamping/imprinting tool ST when the disk D is biased against shaft S by the disk bias means DB.

A typical sequence of steps for performing thermal imprint lithography of a thermoplastic resist layers on both the upper and lower surfaces $D_U$ and $D_L$ of an annular disk-shaped substrate D for a recording medium or for embossing of sol-gel layers on both surfaces of a similar substrate for a recording medium utilizing the stamping/imprinting tool ST of FIG. 6 (or similar device) is as follows: a first one of the upper and lower annular disk-shaped stamper/imprinter means $SM_U$ and $SM_L$ is placed on shaft S via the central opening thereof and centered to the shaft via the respective centering means $CM_U$, $CM_L$ in the form of an expanding collet or resilient polymer ring. An annular disk-shaped substrate D for a recording material with the upper and lower surfaces $D_U$ and $D_L$ thereof coated with a layer of a thermoplastic or sol-gel material is placed on shaft S via the central opening (i.e., inner diameter ID) thereof, the annular disk-shaped substrate D being provided with an identification mark IM at a suitable location, e.g., the inner diameter ID or outer diameter OD, illustratively the inner diameter ID, for use in biasing the inner diameter ID of disc D (via the disk bias means DB) against shaft S of the stamping/imprinting tool ST at a location aligned with the identification mark IM. The second one of the upper and lower annular disk-shaped stamper/imprinter means $SM_U$ and $SM_L$ is then placed on shaft S via the central opening thereof and centered to the shaft via the respective centering means $CM_U$, $CM_L$. Each of the axially movable upper and lower stamper/imprinter means $SM_U$ and $SM_L$ is then pressed against the respective confronting upper and lower surfaces $D_U$ and $D_L$ of disk D to imprint or emboss patterns in the thermoplastic or sol-gel layers on the upper and lower surfaces $D_U$ and $D_L$ of disk D, e.g., servo patterns, corresponding to positive images of the patterns formed in the imprinting surfaces IS thereof. The thus-imprinted disk D is then removed from shaft S (as by disassembly of the sandwich structure of upper stamper/imprinter $SM_U$//disk D//lower stamper/imprinter $SM_L$) and subjected to further processing (in conventional manner as described supra) for forming servo-patterned recording media, e.g., longitudinal or perpendicular magnetic hard disk media.

The servo-patterned, disk-shaped recording media is then installed on a rotatable spindle shaft of a disk drive such that the inner diameter of the disk is biased against the spindle shaft of the disk drive at a location aligned with the identification mark IM utilized during the above-described process for imprinting the servo pattern, analogous to the conventional practice illustrated in FIGS. 5(A)–5(B). As a consequence of utilizing the same location (i.e., contact point) along the inner diameter of the disk for biasing against the spindle shaft of the disk drive as is utilized during the imprinting/embossing process for servo patterning, the imprinted/embossed servo patterns are well centered to the disk drive spindle shaft, whereby a spindle shaft/disk arrangement is obtained which closely simulates that which is obtained when the servo patterns are written onto a biased disk according to the conventional practice described above. Therefore, the imprinted/embossed servo patterns provided by the inventive methodology and apparatus are sufficiently concentric to the rotation axis so that conventional disk drive electronics and control systems can adequately compensate for any deviations from concentricity of the servo patterns.

It should be apparent to one of ordinary skill that the stamping/imprinting tool ST of FIG. 6 (or similar device) can, if desired, be readily modified to include only one of the upper and lower annular disk-shaped stamper/imprinter means $SM_U$ and $SM_L$, whereby only a selected one of the upper and lower surfaces $D_U$ and $D_L$ of disk D is imprinted/embossed with a desired pattern, e.g., a servo pattern.

Thus, the present invention provides means and methodology for reliably forming pre-servo-patterned media with well-centered patterns via thermal imprinting lithography or embossing of sol-gel layers, and for installation of such patterned media in disk drives therefor, in which the patterns are sufficiently well centered as to enable use of conventional disk drive electronics and control systems for compensation of any irregularities, lack of concentricity, etc., of the imprinted or embossed patterns. Moreover, the inventive means and methodology maintain full compatibility with all aspects of automated manufacturing technology for servo-patterned media formation by means of a stamping/imprinting process for embossing the servo patterns in the surface(s) of a disk-shaped recording medium (or substrate therefor).

In the previous description, numerous specific details are set forth, such as specific materials, structures, reactants, processes, etc., in order to provide a better understanding of the present invention. Flowever, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in other combinations and environments and is susceptible of changes and/or modifications within the scope of the inventive concept(s) as expressed herein.

What is claimed is:

1. A method of manufacturing a patterned data/information storage and retrieval medium in the form of an annular disk having an outer diameter, a central opening defining an inner diameter, and opposed first and second major surfaces, said method comprising inserting a smaller diameter cylindrical shaft of a stamping/imprinting tool in said central opening of said disk and biasing said inner diameter of said disk into contact with said cylindrical shaft at a pre-selected location along said inner diameter of said disk during stamping/imprinting of a pre-selected pattern in at least one of said First and second major surfaces of said disk, said biasing creating a space between said inner diameter of said disk and said surface of said cylindrical shaft which has a maximum width at a location diametrically opposite said pre-selected location, wherein said disk is stationary relative to said stamping/imprinting tool during the stamping/imprinting of said pre-selected pattern.

2. The method according to claim 1, wherein said disk is a thin film magnetic recording medium or a substrate therefor and said pattern comprises a plurality of concentric tracks including data zones and servo tracking zones.

3. The method according to claim 1, comprising stamping/imprinting said pre-selected pattern in both of said first and second major surfaces of said disk.

4. The method according to claim 1, wherein said stamping/imprinting of said pattern comprises performing thermal imprint lithography of a layer of a thermoplastic material on at least one of said first and second major surfaces of said disk.

5. The method according to claim 4, further comprising utilizing the thermally imprinted layer(s) as a patterned mask during processing for selectively removing material of said disk exposed through openings formed in said thermally imprinted layer(s).

6. The method according to claim 1, wherein said stamping/imprinting of said pattern comprises embossing of a layer of a partially dried, soft silica sol-gel material on at least one of said first and second major surfaces of said disk.

7. The method according to claim 6, further comprising sintering said partially dried, soft silica sol-gel layer subsequent to embossing for forming a fully densified glass layer having a density and hardness approaching that of silica glass.

8. The method according to claim 1, comprising the steps of:
  (a) providing a said disk including an indicator mark at a location along said inner diameter or said outer diameter of said disk and radially aligned with said pre-selected location along said inner diameter of said disk;
  (b) providing a stamping/imprinting tool comprising:
    (i) an elongated cylindrical shaft having a slightly smaller diameter than said inner diameter of said disk, said cylindrical shaft including a location along the length thereof for positioning said disk thereat via said inner diameter thereof; and
    (ii) at least one annular disk-shaped stamper/imprinter means axially movably mounted on said elongated shaft, said at least one stamper/imprinter means having an imprinting surface including a negative image of said pattern, said at least one stamper/imprinter means being adapted to urge said imprinting surface against a respective facing first or second major surface of said disk;
  (c) inserting said shaft in said central opening of said disk and positioning said disk at said location along said length of said shaft such that at least one of said first and second surfaces thereof faces said imprinting surface of said at least one stamper/imprinter means;
  (d) utilizing said indicator mark as an alignment means in biasing said inner diameter of said disk into contact with the surface of said cylindrical shaft at said pre-selected location along said inner diameter of said disk, whereby a space is created between said inner diameter of said disk and said surface of said cylindrical shaft which has a maximum width at a location diametrically opposite said pre-selected location; and
  (e) urging said imprinting surface of said at least one stamper/imprinter against said at least one facing surface of said disk to imprint said pattern therein.

9. The method according to claim 8, wherein:
  step (b)(ii) comprises providing a pair of axially movable, annular disk-shaped stamper/imprinter means for imprinting both major surfaces of said disk with said pattern; and
  step (b)(i) comprises providing said elongated cylindrical shaft with a pair of resilient means for mounting and centering said pair of stamper/imprinter means on said cylindrical shaft.

10. A method of manufacturing a disk drive system, comprising steps of:
  (a) forming a patterned, annular disk-shaped data/information storage and retrieval medium having an outer diameter, a central opening defining an inner diameter, and opposed first and second major surfaces, comprising inserting a smaller diameter cylindrical shaft of a stamping/imprinting tool in said central opening of said disk and biasing said inner diameter of said disk into contact with said cylindrical shaft at a pre-selected location along said inner diameter of said disk during stamping/imprinting of a pre-selected pattern in at least one of said first and second major surfaces of said disk, wherein said disk is stationary relative to said stamping/imprinting tool during the stamping/imprinting of said pre-selected pattern; and
  (b) mounting said patterned disk on a smaller diameter cylindrical drive spindle shaft of a disk drive by inserting said drive spindle shaft in the central opening of said disk, such that said inner diameter of said disk is biased into contact with said cylindrical drive spindle shaft of said disk drive at said pre-selected location, and a space is created between said inner diameter of said disk and said surface of said cylindrical drive spindle shaft which has a maximum width at a location diametrically opposite said pre-selected location.

* * * * *